US012536854B2

(12) United States Patent
Velusamy et al.

(10) Patent No.: US 12,536,854 B2
(45) Date of Patent: Jan. 27, 2026

(54) ELECTRIC COMPONENT RETENTION IN REMOTE ENTRY DEVICE

(71) Applicant: FCA US LLC, Auburn Hills, MI (US)

(72) Inventors: Ashokkumar Velusamy, Chennai (IN); Jaya Lakshmi N, Chennai (IN)

(73) Assignee: FCA US LLC, Auburn Hills, MI (US)

( * ) Notice: Subject to any disclaimer, the term of this patent is extended or adjusted under 35 U.S.C. 154(b) by 129 days.

(21) Appl. No.: 18/479,422

(22) Filed: Oct. 2, 2023

(65) Prior Publication Data

US 2025/0111719 A1 Apr. 3, 2025

(51) Int. Cl.
*G07C 9/00* (2020.01)

(52) U.S. Cl.
CPC .................... *G07C 9/00944* (2013.01); *G07C 2009/00587* (2013.01); *G07C 2009/00984* (2013.01)

(58) Field of Classification Search
CPC ...... G07C 9/00944; G07C 2009/00587; G07C 2009/00984; G07C 9/00
USPC ........................................ 340/5.64, 5.7, 7.63
See application file for complete search history.

(56) References Cited

U.S. PATENT DOCUMENTS 5,103,216 A * 4/1992 Sisselman ............ G08B 29/181 116/315
5,600,324 A 2/1997 Reed et al.
5,805,423 A * 9/1998 Wever ................. H01M 50/216 439/627
5,822,192 A * 10/1998 Hayashi ................... H05K 5/15 361/752
6,160,487 A * 12/2000 DeLuca ............... G08B 17/113 340/693.11
6,718,240 B1 4/2004 Suda et al.
6,839,034 B2 * 1/2005 Shimura .............. H04B 1/3888 343/702
6,852,929 B2 * 2/2005 Scudder ............. G07C 9/00944 174/67
7,046,136 B2 * 5/2006 Sugimoto ............ H01H 9/0235 340/407.1
7,050,292 B2 * 5/2006 Shimura ............. B60R 16/0239 206/307
7,142,413 B2 11/2006 Sugimoto et al.
7,242,278 B2 * 7/2007 Sugimoto .......... G07C 9/00944 361/752
7,499,283 B2 * 3/2009 De Los Santos ....... B60R 25/24 361/752
7,839,655 B2 11/2010 Clark
7,897,888 B2 * 3/2011 Dimig ................. E05B 19/0082 200/302.2
8,072,766 B2 * 12/2011 Shimura ................ H01H 13/86 361/752

(Continued)

*Primary Examiner* — Nam V Nguyen
(74) *Attorney, Agent, or Firm* — Jeremy J. Klobucar

(57) ABSTRACT

In at least some implementations, a remote entry device includes a body comprising a first portion and a second portion, and a transmitter assembly arranged between the first portion and the second portion. The transmitter assembly includes a first cover, a second cover having a battery receptacle with a central axis, an inwardly extending first battery retention surface, and one or more retaining members each having an inwardly extending battery retention surface axially spaced from the first battery retention surface of the second cover. And the device includes a printed circuit board assembly arranged between the first cover and the second cover.

16 Claims, 3 Drawing Sheets

(56) References Cited

U.S. PATENT DOCUMENTS

| | | | | |
|---|---|---|---|---|
| 8,836,486 | B2 * | 9/2014 | Saito | G07C 9/00944<br>455/90.3 |
| 9,245,430 | B1 * | 1/2016 | Berg | A47G 23/0306 |
| 10,033,050 | B2 * | 7/2018 | Yu | H01M 50/216 |
| 10,843,660 | B2 * | 11/2020 | Saito | G07C 9/00944 |
| 2014/0363716 | A1 * | 12/2014 | Nishida | H01M 50/244<br>429/96 |

* cited by examiner

ELECTRIC COMPONENT RETENTION IN REMOTE ENTRY DEVICE

FIELD

The present disclosure relates to a remote entry device and, more particularly, to retention of electrical components in a remote entry device.

BACKGROUND

Vehicles commonly require a key to gain access and initiate operation of the vehicle. The key may be a remote entry device that includes physical buttons to lock the vehicle, unlock the vehicle, and to open the liftgate (i.e., boot) of the vehicle, for example. The key typically includes a printed circuit board assembly (PCBA) which includes a microcontroller, a battery, and an antenna. Instances exist where the battery is disconnected from the PCBA, for example, when the key fob is mishandled (e.g., dropped or shaken) or subjected to constant vibrations. If the battery is even temporarily disconnected as a result of these circumstances, the key may fail to function properly when a button is subsequently pressed by a user. Thus, a need exists to maintain electrical communication within remote entry devices.

SUMMARY

In at least some implementations, a remote entry device includes a body comprising a first portion and a second portion, and a transmitter assembly arranged between the first portion and the second portion. The transmitter assembly includes a first cover, a second cover having a battery receptacle with a central axis, an inwardly extending first battery retention surface, and one or more retaining members each having an inwardly extending battery retention surface axially spaced from the first battery retention surface of the second cover. And the device includes a printed circuit board assembly arranged between the first cover and the second cover.

In at least some implementations, the battery receptacle is defined at least in part by an opening extending through the second cover, and wherein the first battery retention surface is defined by a circumferentially extending rim extending radially into the opening toward the central axis. In at least some implementations, a battery cover is provided that has a main wall that overlaps the battery receptacle and a rim extending axially from the main wall, the rim being arranged for a press-fit or snap-fit in the opening to retain the battery cover on the second cover.

In at least some implementations, the one or more retaining members have a cantilever portion coupled to the second cover adjacent to the opening and a tab protruding from the cantilever portion toward the central axis, where the tab extends axially beyond a top side of the second cover. In at least some implementations, at least one of the one or more retaining members is aligned with an inset passage of the second cover, where the inset passage is located radially outwardly of the at least one retaining member and the at least one retaining member is flexible and can flex outwardly into the inset passage. In at least some implementations, at least one of the one or more retaining members includes a cantilever portion and a tab extending inwardly into the opening, the cantilever portion is stationary, and the tabs define additional battery retention surfaces that are axially spaced from the first retention surface.

In at least some implementations, a battery cover has a main wall that overlaps the battery receptacle and a rim extending axially from the main wall, the rim being arranged for a press-fit or snap-fit in the opening to retain the battery cover on the second cover, and wherein the battery cover includes openings therethrough that receive at least part of the one or more retaining members. In at least some implementations, part of the battery cover is located radially outwardly of the one or more retaining members and inhibits radially outward flexing of the one or more retaining members.

In at least some implementations, the one or more retaining members include a clip coupled to the second cover, and a cradle coupled to the clip, the cradle extends circumferentially and axially within the opening and the cradle has one or more tabs that extend radially into the opening and are arranged to overlap a battery in the battery receptacle.

In at least some implementations, a key fob, includes a body defining an interior, a first cover and a second cover received within the interior, a printed circuit board assembly, a battery and a battery cover. The second cover has a battery receptacle that is defined in part by an opening with a central axis, and an inwardly extending first battery retention surface. The second cover has one or more retaining members each having an inwardly extending second battery retention surface axially spaced from the first battery retention surface. The printed circuit board assembly is located in the interior between the first cover and the second cover, and the battery is received in the battery receptacle against the first battery retention surface and overlapped by the second battery retention surfaces, and engages part of the printed circuit board assembly. The battery cover has a main wall that overlaps the battery and a rim extending axially from the main wall. The rim is arranged for a press-fit or snap-fit in the battery receptacle to retain the battery cover on the second cover. The battery cover includes openings that receive at least part of the one or more retaining members to maintain a position of the retaining members relative to the battery. In at least some implementations, the one or more retaining members include one or more snap-fit retainers radially spaced around the opening and arranged to flex outwardly from an unflexed position when a battery is installed into the receptacle and to resiliently return toward the unflexed position. In at least some implementations, the one or more snap-fit retainers comprises a cantilever portion that extends axially within the opening and extends beyond a top side of the second cover, and incudes a tab protruding from the cantilever portion toward a central axis. In at least some implementations, the one or more retaining members comprise one or more stationary retainers radially spaced around the opening and that are connected to the second cover to prevent radially outward flexing of the stationary retainers.

In at least some implementations, part of the battery cover is located radially outwardly of the one or more snap-fit retainers and inhibits radially outward flexing of the one or more snap-fit retainers.

In at least some implementations, the battery cover is formed from an elastomeric material and the main wall engages the battery. In at least some implementations, the battery cover has a hardness in a range of 50 to 100 shore hardness 'A', and is arranged to damp vibrations or forces on the battery.

In at least some implementations, the one or more retaining members include a clip coupled to the second cover and extending into the opening, and a cradle coupled to the clip, wherein the cradle is radially outward of the battery and is flexible and provides a radial biasing force on the battery, and the cradle has one or more tabs that extend radially into the opening and overlap the battery. In at least some implementations, the one or more tabs overlap a first side of the battery that is axially spaced from a second side of the battery that is engaged with the rim.

In the constructions and arrangements of a key fob described herein, a battery retention arrangement is provided that securely axially and radially retains the position of the battery within the key fob. Further, various flexible and resilient features may be used to hold the battery in place and these features may damp vibrations or forces on the battery to inhibit battery movement. A battery cover may be simply fitted to a cover of the key fob in an axial direction, such as by an interference/press fit or snap-fit, without need for fasteners. The battery cover may be formed from an elastomeric material having a hardness chosen to damp vibrations and forces on the battery. The battery cover may also inhibit movement of one or more flexible battery retaining members to maintain the position of the battery retaining members relative to the battery. The arrangements provide simple but robust retention for the battery as well as a circuit board and other components of the key fob.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
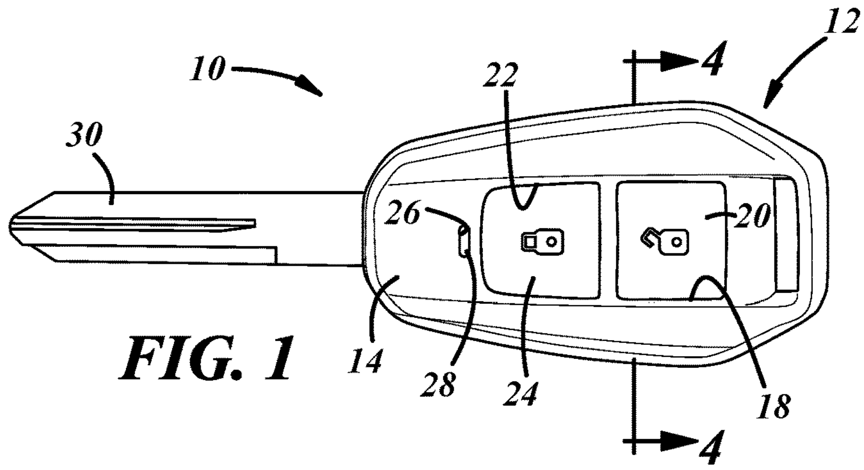
FIG. 1 is a front view of a remote entry device according to an embodiment of the present disclosure.
Figure 2:
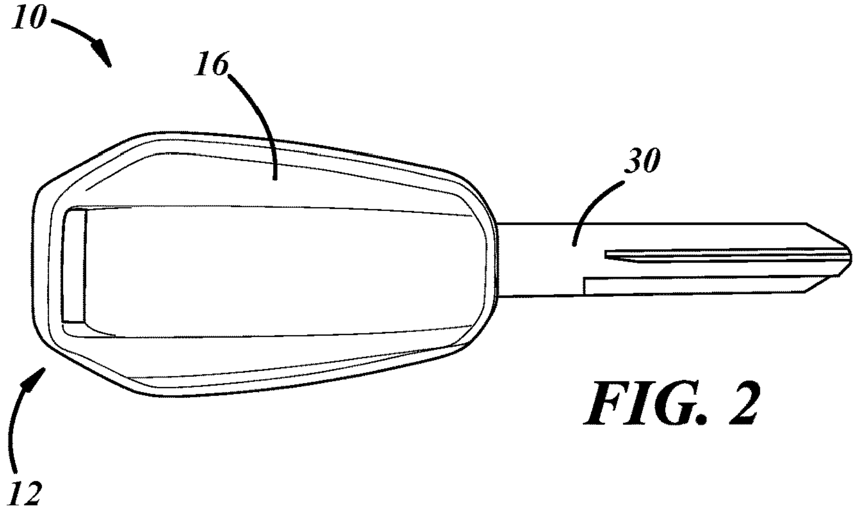
FIG. 2 is a rear view of a remote entry device of FIG. 1.

Referring in more detail to the drawings, FIG. 1 shows a remote entry device, also called a key fob 10, for a vehicle. The key fob 10 may include a body 12 which includes a first or front portion 14 and a second or rear portion 16 (FIG. 2) which may be coupled to each other and define an interior 17 (FIG. 4) in which electronic components are received. The front and rear portions 14, 16 may be disassembled without damage to the key fob 10 to permit access to components within the body 12. A first opening 18 for a first button (e.g., a door unlock button) 20 and a second opening 22 for a second button (e.g. a door lock button) 24 may be arranged on the front portion 14. A third opening 26 may also be arranged on the front portion so that light emitted from an internal light (e.g., a LED) 28 may be visible through the front portion 14 of the key fob 10. The front portion 14 or the rear portion 16 may include additional openings such as one for an antenna that communicates with the vehicle, or for a liftgate button for opening and closing a liftgate of the vehicle, or for a button to remotely start the vehicle, or operating windows of the vehicle, for example. The key fob 10 may also include a mechanical key 30, sometimes called a key blade, extending from or stored within the body 12.

Figure 3:
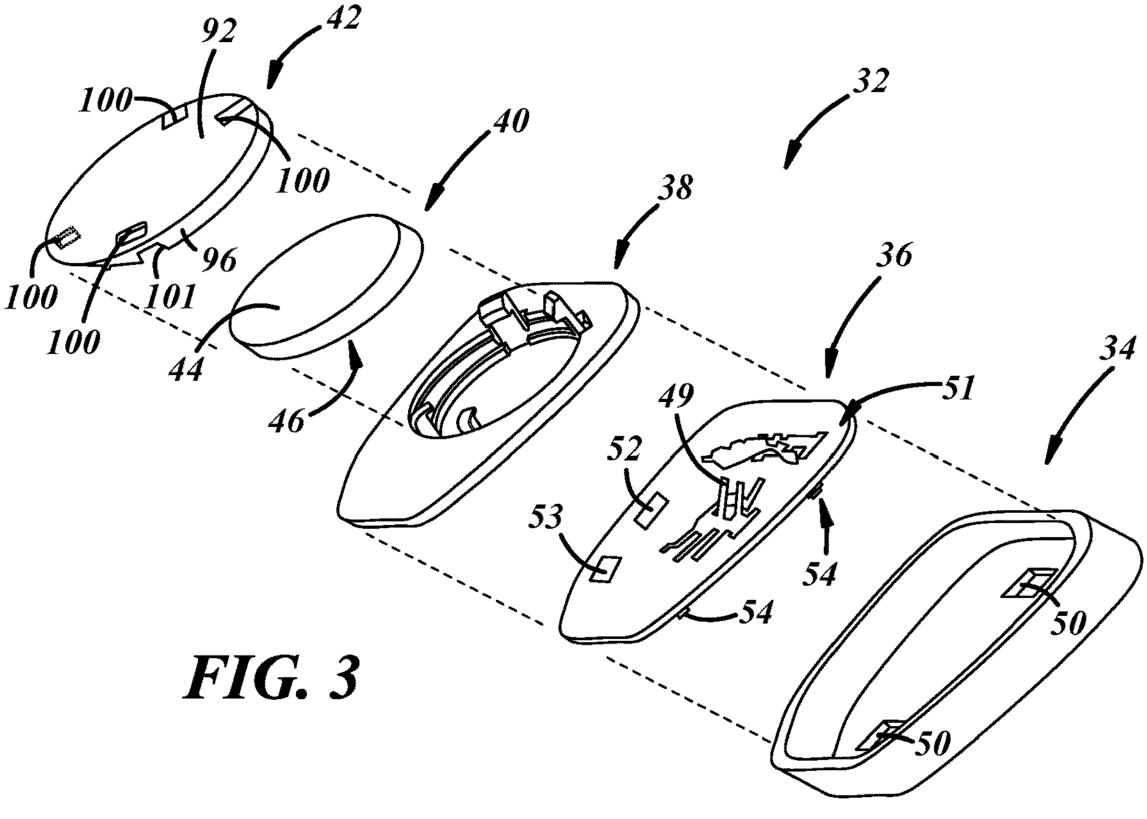
FIG. 3 is an exploded view of a transmitter assembly including a first cover, a printed circuit board assembly, a second cover, a battery, and a battery cover.
Figure 4:
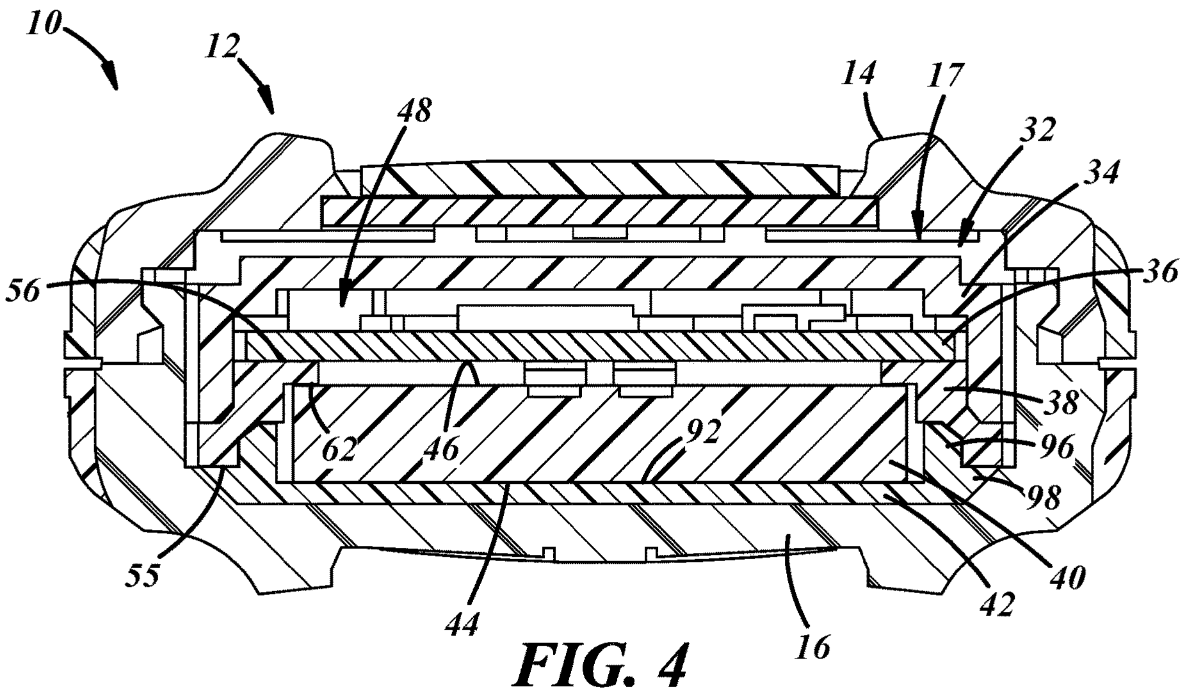
FIG. 4 is a cross sectional view of the remote entry device along line 4-4 in FIG. 1.

As shown in FIGS. 3 and 4, the key fob may include a transmitter assembly 32 which may be received within the body interior 17 (labeled in FIG. 4). The transmitter assembly 32 may include a first cover, called herein a front cover 34, a printed circuit board assembly 36 (PCBA), a second cover, called herein a rear cover 38 (also called a printed circuit board assembly cover), a battery 40, and a battery cover 42. The battery 40 may be a flat, round disc battery, such as a type CR2032, and may include a positive terminal 44 and negative terminal 46 and is shown arranged between the battery cover 42 and the rear cover 38. The positive terminal 44 may be protected by the battery cover 42, as shown in FIG. 4. The PCBA may be arranged between the rear cover 38 and the front cover 34 and, as shown in FIG. 4, may define a cavity 48 that may receive and/or enclose part of the PCBA 36.

The front cover 34 may be received between the front portion 14 and the PCBA 36 and may include one or more holes 50 (FIG. 3) through which the first and second buttons 20, 24 (FIG. 1) are communicatively coupled with the PCBA 36. As shown in FIG. 3, the front cover 34 may define at least part of a cavity that is similar to the shape of the PCBA so that the PCBA may be securely arranged and retained within the front cover 34.

The PCBA 36 may include transmitter components 51 such as a microcontroller 52 and an antenna 53 and is configured to receive electrical power from the battery 40. To engage the negative terminal 46 of the battery 40, an electrically conductive contact 49 is connected to the PCBA 36. Additionally, one or more tact switches 54 may be coupled to the PCBA and correspond with the holes 50 so that a signal may be sent from the key fob 10 upon a user actuating one of the first or second buttons 20, 24, for example.

Figure 5:
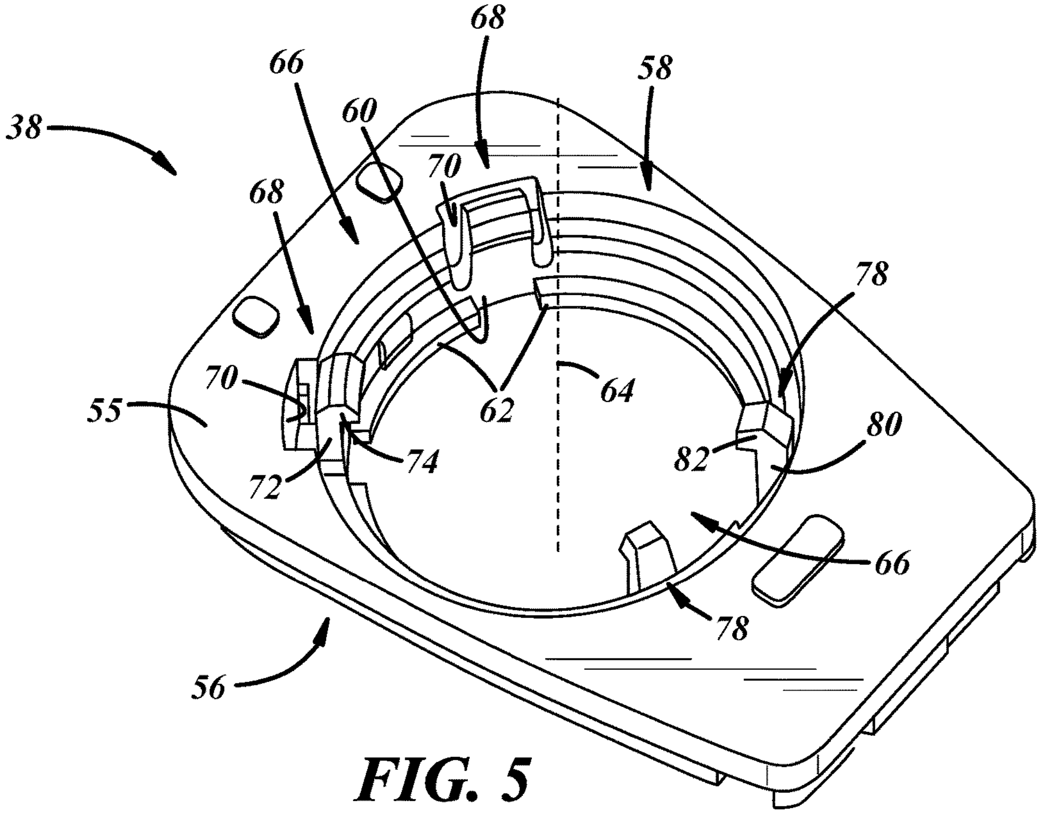
FIG. 5 is a perspective view of the second cover shown in FIG. 2.

With reference to FIG. 5, the rear cover 38 is shown including a top side 55, a bottom side 56 (FIG. 4), and a battery receptacle 58 for securely retaining the battery 40 (FIG. 4). The battery receptacle 58 includes an opening 60 that extends through the top side 55 and the bottom side 56. A circumferentially extending lip or rim 62 may extend radially inwardly from the opening 60 adjacent to the bottom side 56 and toward a central axis 64 and provide support for a lower surface (e.g., at or adjacent to the negative terminal 46) of the battery (FIG. 4), for example. Thus, the rim 62 may provide a radial or inwardly extending battery retention surface.

The battery receptacle 58 may include one or more retaining members 66, such as first or snap-fit retainers 68 that are circumferentially spaced apart adjacent to the opening 60 and circumferentially aligned with and radially inwardly located from inset recesses 70 of the rear cover 38. Each of the snap-fit retainers 68 may include a base 72 that is cantilevered to the rear cover 38 and extends axially upwardly from a base below the top side 55 to a free end located axially beyond the top side 55. The free end includes a tab 74 protruding radially inwardly from the base 72 toward the central axis 64. The snap-fit retainers 68 may be circumferentially spaced apart by between 30 degrees and 120 degrees, and may flex radially outwardly into the recesses 70 during installation of a battery 40 into the battery receptacle 58 so that the battery can slide past the tabs 74. The snap-fit retainers may also be resilient so that the snap-fit retainers 68 return toward their unflexed positions after the battery 40 passes the tabs 74 so that the tabs 74 radially overlap the battery 40 and help to retain the battery 40 in the battery receptacle 58.

The battery receptacle 58 may also include one or more second or stationary retainers 78 that are circumferentially spaced around the opening 60. The stationary retainers 78 may include a cantilever portion 80 and a tab 82. In the embodiment shown in FIG. 5, the cantilever portion 80 of the stationary retainers 78 rest against the rear cover 38 within the opening 60 and do not flex in same manner as the snap-fit retainers 68. Nonetheless, in at least one embodiment, one or more of the stationary retainers 78 may correspond with inset recesses of the rear cover 38 so that they may flex in a similar or in the same manner as the snap-fit retainers 68 described above.

Figure 7:
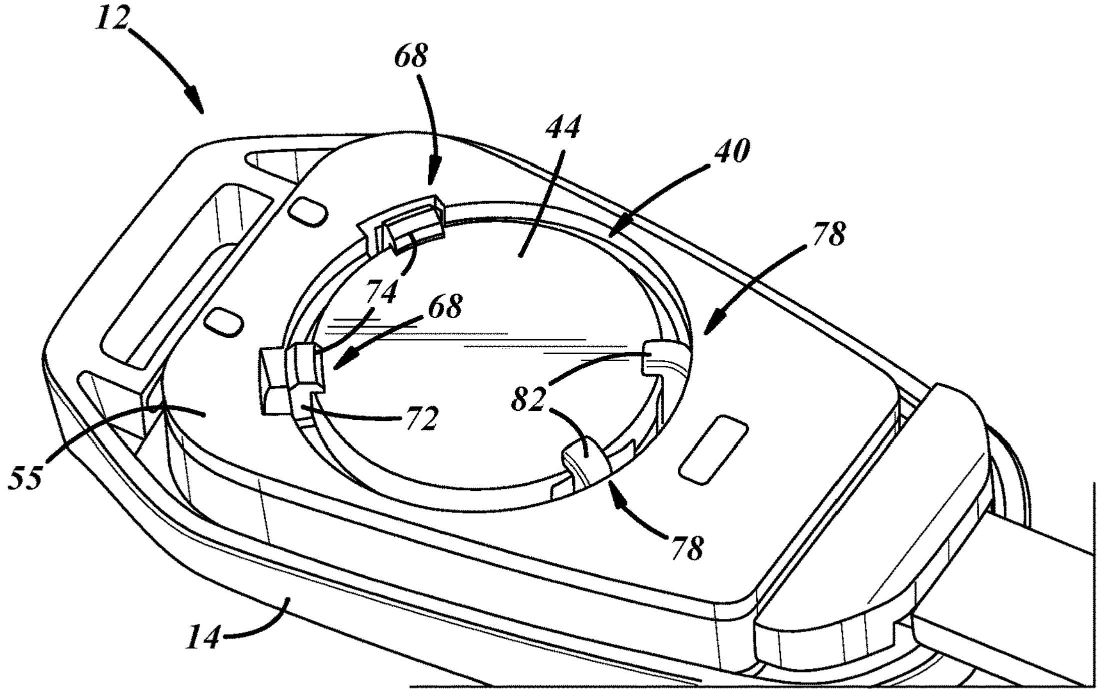
FIG. 7 is a perspective view of the remote entry device of FIG. 1 with a rear portion removed.

With reference to FIG. 7, during installation of the battery 40, a portion of the battery 40 may initially be inserted under the tabs 82 of the stationary retainers 78. The battery 40 may then be forced downward toward the front portion 14 of the body 12 on the tab 74 of the one or more snap-fit retainers 68 to outwardly flex the snap-fit retainers 68 and allow the battery 40 to pass the tabs 74. As the battery passes the tabs 74, the snap-fit retainers 68 will resiliently return to or toward their original position so that the tabs 74 radially overlap and rest against a portion of the positive terminal 44 of the battery 40 to secure the battery 40 axially between the circumferential rim 62 (FIG. 5) and the tabs 74 and 82 of the retainers 68, 78, and radially between the retainers 68, 78. Thus, the tabs 74, 82 define radial or inwardly extending battery retention surfaces that are axially spaced from another battery retention surface defined by the rim 62. The battery 40 is securely held in place to avoid movement of the battery and interruption of electrical current that might otherwise arise from vibrations or shock forces when the key fob is dropped or shaken, for example.

Figure 6:
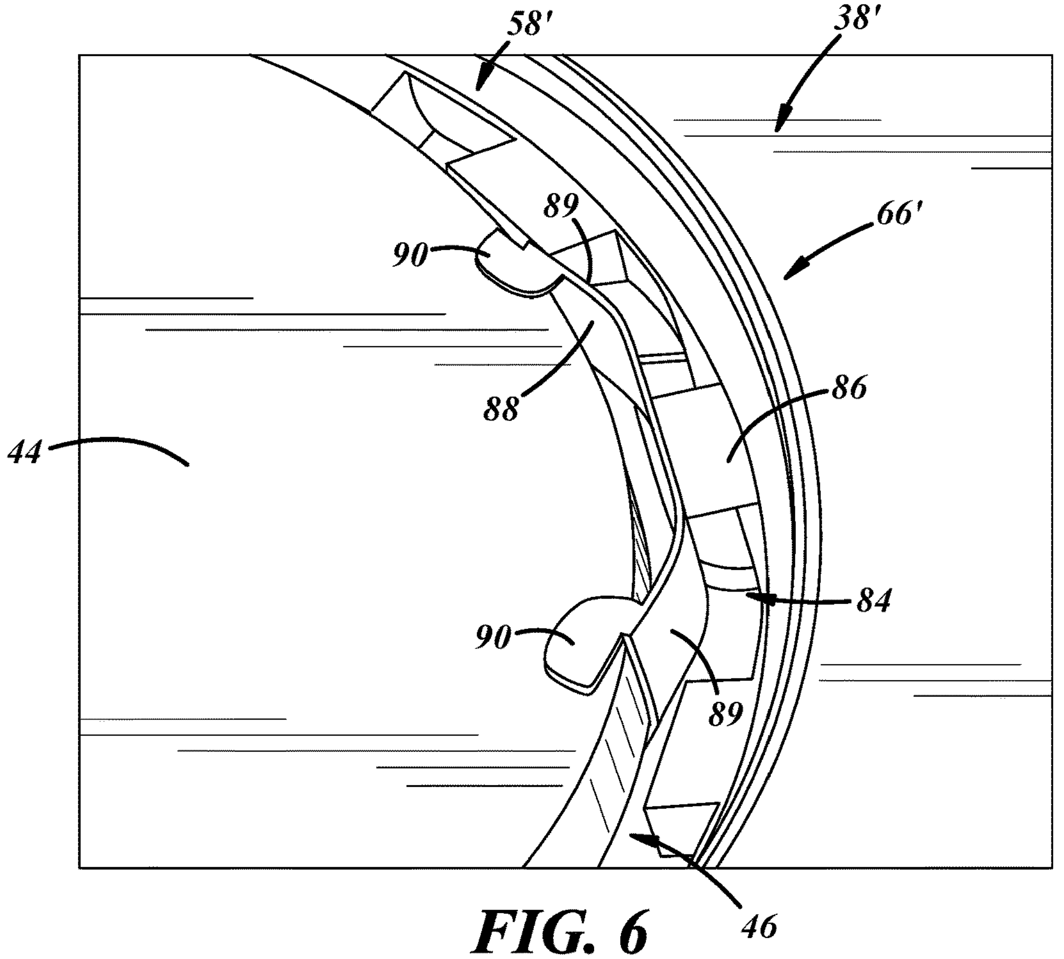
FIG. 6 is a fragmentary perspective view of the second cover according to another embodiment.

Another embodiment of the rear cover 38' is shown in FIG. 6. In this example, the battery receptacle 58' may include another retaining member 66' shown as a cradle 84, which may be provided instead of the stationary retainers 78, to receive and/or support and retain a portion of the battery 40. The cradle 84 may include a clip 86 coupled to the rear cover 38 and a retainer 88 that is coupled to a radially inner side of the clip 86. The retainer 88 may be arranged within the opening 60, extending circumferentially and axially, with circumferentially spaced end portions 89 bent radially inwardly toward the central axis 64. The clip 86 may be embedded within a portion of the rear cover 38, attached with an adhesive, welded, heat staked or coupled to the rear cover 38 using a fastener or another suitable method, for example. The retainer 88 may be formed of a metal or any suitable material, and may be coupled to the clip 86 via adhesive, soldering, welding, or using another suitable method. Note, while the cradle 84 is shown in the drawings as two separate components coupled to each other (i.e., the clip 86 and the retainer 88), the cradle may also be one integral component formed from a single piece of material, via stamping, 3D printing (i.e., additive manufacturing), or another suitable method to simplify manufacturing and reduce cost.

The retainer 88 may include one or more tabs 90 at an axially upper end that extend radially inwardly and are arranged to overlap and contact the positive terminal 44 of the battery 40. As such, when the battery 40 is installed in the cradle 84 it is axially trapped between the tabs 90 and the rim 62, and is radially held by the cradle 84 and retainers (e.g., retainers 68 as shown in FIG. 5) and is inhibited or prevented from moving radially or axially along the central axis during vibration events (e.g., due to shaking or dropping the key fob 10). The retainer 88 may be flexible and resilient and may serve as a biasing member to bias the battery 40 radially toward one or more other retaining members arranged diametrically opposite of the retainer (e.g., snap-fit retainers 68 as shown in FIG. 5). The flexible and resilient retainer 88 may also damp or absorb vibrations to reduce the force of vibrations or shock/impact forces on the battery 40 and help to more securely retain the position of the battery.

The battery cover 42 may include a main wall 92 that overlaps the positive terminal of the battery and is received between the battery 40 and the rear portion 16 of the body 12, as shown in FIG. 4. A peripheral rim 96 may axially extend from the main wall 92 and, in assembly, is received in the opening 60 of the battery receptacle 58, and may include a radially flange 98 that abuts the top side 55 of the rear cover 38 when the battery cover 42 is fully installed. The battery cover 42 may include one or more openings 100 which extend through the main wall 92 and are circumferentially spaced from one another. As shown in FIG. 3, the battery cover 42 is arranged to be complimentary to the battery receptacle 58 of the rear cover 38. In this example, the battery cover 42 has four openings 100 spaced inwardly from the periphery of the main wall 92 and that are aligned with and receive part of the snap-fit retainers 68, 78. Additionally, as best shown in FIG. 3, one or more slots 101 may be formed in the rim 96 to provide clearance for part of a retainer 68, 78 as the battery cover 42 is snap-fit or interference fit into the rear cover 38, for example. To ensure the battery cover protects and holds the battery 40, it may be desirable for the battery cover 42 to be made of any form of synthetic rubber material (e.g., EPDM, silicone rubber, natural rubber, PVC rubber, etc.) and maintained between 50 to 100 shore hardness 'A'. It may be desirable for the material of the battery cover 42 to be maintained at greater than 50 shore hardness 'A', maintained at less than 100 shore hardness 'A,' or maintained between 60 to 90 shore hardness 'A' (e.g., 75 shore hardness 'A') to ensure the battery cover 42 holds and protects the battery 40 within the key fob 10.

With respect to the first embodiment, the battery cover 42 may be arranged on the rear cover 38 so that the snap-fit retainers 68 and stationary retainers 78 extend into the openings 100 so that the retainers 68, 78 are radially trapped and held in position overlapping the battery. In other words, the battery cover 42 prevents the retainers 68, 78 from flexing outwardly to a position where the battery 40 might come loose, and prevents the battery 40 from moving radially during vibrations events (e.g., due to shaking or dropping the key fob 10). With respect to the rear cover 38' that includes the cradle 84, the battery cover 42 may be arranged on the rear cover 38 so that the snap-fit retainers 68 extend into the openings 100 and another portion of the battery cover 42 is received radially outwardly of and prevents the cradle 84 from flexing radially outwardly. In other words, the battery cover 42, may maintain the position of the battery retainers and help prevent the battery 40 from moving during vibration events. The battery cover 42 may also be formed of a material that damps or absorbs vibrations to reduce the force of vibrations on the battery 40.

In the arrangements described herein, including the non-limiting and representative examples shown in the drawings, a key fob is provided with a battery retention scheme that securely holds a battery in position and inhibits or prevents movement of the battery of a degree that would cause temporary electrical disconnection of the battery from the circuit in which it is connected. By preventing electrical disconnection of the battery, the key fob can function better with respect to rolling code protocols stored in memory and utilized in the wireless connection between the key fob and the vehicle. With less relative movement of components in the key fob, there is less wear and improved durability and useful life of the components and the key fob.

Among other things, the constructions and arrangements of a key fob described herein, a battery retention arrangement is provided that securely axially and radially retains the position of the battery within the key fob. Further, various flexible and resilient features may be used to hold the battery in place and these features may damp vibrations or forces on the battery to inhibit battery movement. A battery cover may be simply fitted to a cover of the key fob in an axial direction, such as by an interference/press fit or snap-fit, without need for fasteners. The battery cover may be formed from an elastomeric material having a hardness chosen to damp vibrations and forces on the battery. The battery cover may also inhibit movement of one or more flexible battery retaining members to maintain the position of the battery retaining members relative to the battery. The arrangements provide simple but robust retention for the battery as well as a circuit board and other components of the key fob.

What is claimed is:

1. A remote entry device, comprising:
- a body comprising a first portion and a second portion;
- a transmitter assembly arranged between the first portion and the second portion, the transmitter assembly comprising:
  - a first cover,
  - a second cover having a battery receptacle with a central axis, the battery receptacle is defined at least in part by an opening extending through the second cover and the second cover has an inwardly extending first battery retention surface, and the second cover has one or more retaining members each having an inwardly extending battery retention surface axially spaced from the first battery retention surface of the second cover,
  - a printed circuit board assembly arranged between the first cover and the second cover; and a battery cover having a main wall that overlaps the battery receptacle and a rim extending axially from the main wall, the rim being arranged for a press-fit or snap-fit in the opening to retain the battery cover on the second cover, and wherein the battery cover includes openings therethrough that receive at least part of the one or more retaining members and wherein part of the battery cover is located radially outwardly of the one or more retaining members and inhibits radially outward flexing of the one or more retaining members.

2. The device of claim 1 wherein the first battery retention surface is defined by a circumferentially extending rim extending radially into the opening toward the central axis.

3. The device of claim 2 wherein the one or more retaining members include a clip coupled to the second cover, and a cradle coupled to the clip, the cradle extends circumferentially and axially within the opening and the cradle has one or more tabs that extend radially into the opening and are arranged to overlap a battery in the battery receptacle.

4. The device of claim 1 wherein the one or more retaining members have a cantilever portion coupled to the second cover adjacent to the opening and a tab protruding from the cantilever portion toward the central axis, where the tab extends axially beyond a top side of the second cover.

5. The device of claim 4 wherein at least one of the one or more retaining members is aligned with an inset passage of the second cover, where the inset passage is located radially outwardly of the at least one retaining member and the at least one retaining member is flexible and can flex outwardly into the inset passage.

6. The device of claim 4 wherein at least one of the one or more retaining members includes a cantilever portion and a tab extending inwardly into the opening, the cantilever portion is stationary, and the tabs define additional battery retention surfaces that are axially spaced from the first retention surface.

7. The device of claim 1 wherein the first portion and the second portion define an interior, the first cover, second cover and the printed circuit board are separate from the first portion and the second portion, and the first cover, second cover and the printed circuit board are received within the interior.

8. The device of claim 1 wherein the battery cover is connected to the second cover and the battery cover is a separate component from the first portion and the second portion.

9. A key fob, comprising:
- a body defining an interior;
- a first cover received within the interior;
- a second cover received within the interior and having a battery receptacle, the battery receptacle defined in part by an opening with a central axis and an inwardly extending first battery retention surface, and the second cover has one or more retaining members each having an inwardly extending second battery retention surface axially spaced from the first battery retention surface;
- a printed circuit board assembly in the interior between the first cover and the second cover;
- a battery received in the battery receptacle against the first battery retention surface and overlapped by the second battery retention surfaces, the battery engaging part of the printed circuit board assembly; and
- a battery cover having a main wall that overlaps the battery and a rim extending axially from the main wall, the rim being arranged for a press-fit or snap-fit in the battery receptacle to retain the battery cover on the second cover, and wherein the battery cover includes openings through the main wall and located radially inward of the rim, the openings receive at least part of the one or more retaining members that receive at least part of the one or more retaining members and wherein part of the battery cover is located radially outwardly of the one or more retaining members and inhibits radially outward flexing of the one or more retaining members.

10. The key fob of claim 9 wherein the one or more retaining members comprise one or more snap-fit retainers radially spaced around the opening and arranged to flex outwardly from an unflexed position when the battery is installed into the receptacle and to resiliently return toward the unflexed position.

11. The key fob of claim 10 wherein the one or more snap-fit retainers comprises a cantilever portion that extends axially within the opening and extends beyond a top side of the second cover, and incudes a tab protruding from the cantilever portion toward a central axis.

12. The key fob of claim 10 wherein the one or more retaining members comprise one or more stationary retainers radially spaced around the opening and that are connected to the second cover to prevent radially outward flexing of the stationary retainers.

13. The key fob of claim 9 wherein the battery cover is formed from an elastomeric material and the main wall engages the battery.

14. The key fob of claim 13 wherein the battery cover has a hardness in a range of 50 to 100 shore hardness 'A', and is arranged to damp vibrations or forces on the battery.

15. The key fob of claim 9 wherein the one or more retaining members include a clip coupled to the second cover and extending into the opening, and a cradle coupled to the clip, wherein the cradle is radially outward of the battery and is flexible and provides a radial biasing force on the battery, and the cradle has one or more tabs that extend radially into the opening and overlap the battery.

16. The key fob of claim 15 wherein the one or more tabs overlap a first side of the battery that is axially spaced from a second side of the battery that is engaged with the rim.

* * * * *